Patented Apr. 29, 1952

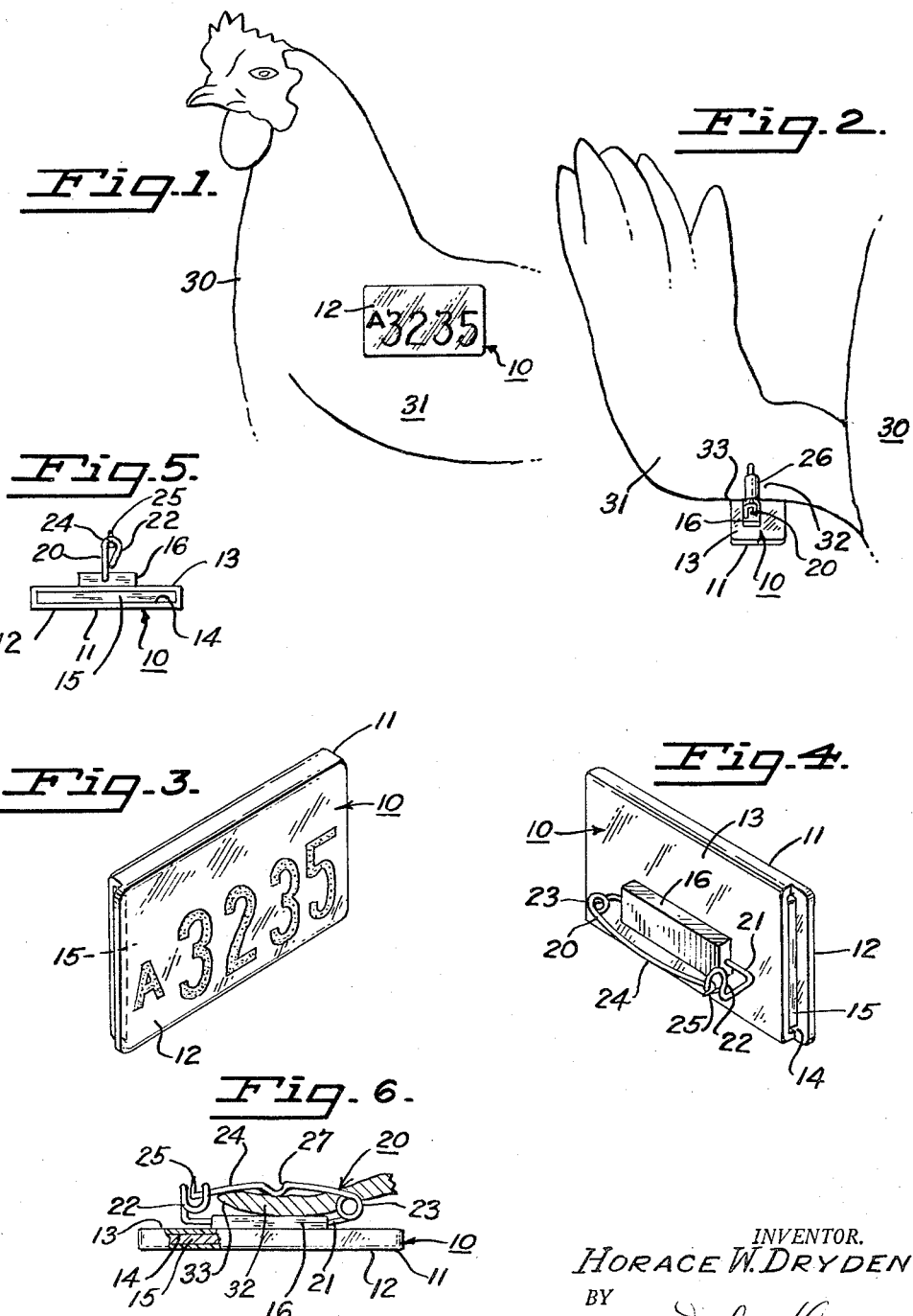

2,594,623

UNITED STATES PATENT OFFICE 2,594,623

FOWL IDENTIFICATION MARKER

Horace W. Dryden, Modesto, Calif.

Application December 15, 1947, Serial No. 791,721

3 Claims. (Cl. 40—3)

This invention relates to a method and apparatus for marking fowls. More particularly, it relates to identification apparatus and to a method of attaching the apparatus to a chicken so that it will stay attached for the life of the chicken.

Identification of fowls has been a great aid to modern poultry breeding. Definite identification, combined with breeding history and trapnest records of egg production made possible by identification, enables quick evaluation of individual hens and accurate and scientific culling of the flock.

The conventional method of marking a chicken is to encircle one of its legs with a numbered band. These leg bands, however, have many disadvantages. Special tools are required to attach them. The numerals on leg bands are, of necessity, small and many costly breeding mistakes have resulted from the poor legibility of all types of leg bands. The embossed numerals on metallic bands are especially hard to read, and numerals applied to the surface of metal or plastic bands soon wear off. Further, from the standpoint of practical use, the leg is a poor location for the identification marker. Chickens run about getting their feet, legs, and leg bands coated with mud so that the numbers cannot be read until the bands are wiped off. Even when they have been wiped clean, they are difficult to read because of the distortion that occurs when the band is bent into a circular shape around the chicken's small leg. Moreover, all leg bands have the serious disadvantage that, in order to read them, the bird must be handled, and this, in itself, is a time-consuming operation, especially on a large ranch where a thousand or more hens must be identified every day, mostly during a relatively short peak period of egg laying.

Another approach to the identification problem has been the use of a badge suspended from the neck or wing of the bird by harness or clip. These badges, if attached to a young chicken, uniformly have required adjustment or replacement as the chicken grows larger.

One type of harness-suspended badge is shown in U. S. Patent No. 1,475,906. It requires that the chicken be caught and the harness adjusted for size three times during the growing period. Furthermore, this marker lies on the back of the bird and is readable only from directly above the chicken.

The wing tip type of marker is shown in U. S. Patent No. 881,152. It is formed as an oblong loop which is slipped over the tip of the wing adjacent to the body of the fowl. Such a clip is effectively attachable only to full grown birds. If the marker is to be used with young birds, small sized clips are required to fit the narrow scapula of its wing. During its growth, a bird bearing this type of encircling clip must be caught many times and reclipped with a wider-looped clip before the outgrown loop deforms the wing. In addition these identification clips have slipped off or have been thrown off when a strong bird flexes or beats its wings.

Other methods of attaching identification markers have been tried, but up to now, none has proved thoroughly satisfactory. In addition to the above-explained disadavantages, these markers have, in general, been too easily lost and too hard to read and have caused the bird nervous and physical harm.

The problem has been how to provide a large, conspicuous number held in a position so it is easily readable without handling the bird and which, when once attached to a young fowl is attached for the life of the bird. A life-time marker obviates recurring marking periods with their attendant work and their chances for mistakes.

It is an object of this invention to provide a fowl-marker which solves the above-mentioned problems.

Another object of this invention is to provide a fowl-marker which, when properly attached, will always hang in a vertical position where it can easily and accurately be read.

Another object of this invention is to provide a method of utilizing the structure of the bird so that a large marker can be quickly and safely applied to the bird in a more convenient location than heretofore.

Another object of this invention is to provide a method of attaching a fowl marker to the bird which will hold it permanently in a position where it can be read without handling the bird.

Another object of this invention is to provide a method of attaching a fowl marker to the wing of the bird.

Another object of this invention is to provide an identifying marker which will stay attached to the wing.

Still another object of this invention is to provide a fowl-marker which will not hurt the bird.

A further object of this invention is to provide an identifying fowl-marker which will speed up trap-nesting by reducing the time it takes to identify each bird.

Still a further object is to provide a marker which need never be changed during the growth of the chicken.

Other objects and advantages of the invention will appear from the following description. A specific embodiment is described in detail, in accordance with U. S. Revised Statutes, Section 4888, but the claims are not intended to be limited to this specific embodiment.

In the drawings:

Fig. 1 is a view of a chicken with a marker of the type disclosed in this specification, shown as it appears on the bird when applied in accordance with the method herein disclosed;

Fig. 2 is a top view of an extended chicken wing, showing a badge pinned through the web of the wing, in accordance with the principles of this invention;

Fig. 3 is a perspective view looking at the front of a preferred type of marker;

Fig. 4 is a view in perspective, looking at the rear of the same marker;

Fig. 5 is an end view in elevation of the marker; and

Fig. 6 is a view, partly in section, looking down on the marker and a portion of the wing of the fowl.

Essentially the marker of this invention includes a body portion formed with a recess between the front and back section. The front section, if not transparent, is formed with an opening or window which takes up substantially the whole area of the front section. Attached to the back section is a means for clipping the body portion to the wing of the bird, the means being so arranged that the badge will always hang vertically in the reading position.

The method of this invention comprises pinning a badge around the leading edge of the chicken wing. The free arm of the badge pin is passed through the web or membrane of the wing at a point almost the length of the pin from the edge of the wing, and then is locked in its clamp or catch.

Referring now to the drawings, the fowl marker consists in a pin-type badge 10. The badge body portion is preferably a case 11 having a front wall 12 and a rear wall 13 formed with a recess 14 between them, adapted to receive a numbered card 15. If the case 11 is of plastic composition, the front wall 12 should preferably be transparent to enable reading of the card enclosed within the case. If a metallic or other non-transparent case is used, said front wall 12 should be formed with an opening or window so that the number on the card remains visible when the card 15 is in the recess. In either event, the card 15 may be held in the recess 14 by friction against the case or it may be stuck to the case 11 by a suitable adhesive or by stapling.

Rigidly attached to the rear wall 13 of the case 11 and preferably below and parallel to the central lengthwise axis of said wall is a pin 20. With the plastic type of case illustrated in the drawings, this attachment of the pin is preferably effected through a supporting plastic base 16 which is molded integral therewith, cemented thereto, or otherwise rigidly fastened. When a metal case is used, the pin 20 may be soldered or brazed thereto or otherwise permanently affixed.

The clip-type pin 20, whose stationary arm 21 is suitably held to the case 11, terminates in a clip or catch 22, which is preferably made in the bent-over U-shape shown in Figs. 4 and 6.

The pin 20 is preferably made in one piece, with a single-coil 23 which gives resiliency to the free arm 24. Said free arm 24 is preferably sharp and pointed and is bent out to form a hook 25, which, when the pin is closed, projects out through the middle of the catch 22. If desired, the free arm 24 may be encased or slidably fitted with a short piece of rubber or resilient-plastic tubing 26 (see Fig. 2) for additional protection to the chicken wing. The tube 26 protects the wing of the bird by acting as a cushion and effects sufficient pressure to avoid undue relative movement of the badge and wing. The same pressing effect may be accomplished by a bow 27 in the free arm 24, as shown in Fig. 6.

The badge 10 may be placed on the fowl 30 when the fowl's wing 31 is extended into the position illustrated in Fig. 2, with the inside of the wing 31 showing. The preferable procedure is clearly shown in Fig. 6 where the arm 24 of the pin 20 pierces the web 32 of the wing 31 at a point in from the edge 33 of the wing almost the length of the pin 20. The hook 25 of the arm 24 can be brought over about one inch of the web 32 and beyond the leading edge 33 of the wing and then locked into the clasp 22.

An alternative procedure is to place the open pin 20 with the coil 23 adjacent to the leading edge 33 of the wing and the clasp 22 and hook 25 on the opposite sides of the wing web 32. The point 25 is then stuck through the web at a point almost the length of the pin 20 from the edge 33 and locked into the clasp 22. To prevent accidental unclasping, the clasp 22 may be crimped by a pair of pliers into the position shown in Fig. 5, so that the pin arm 24 cannot possibly disengage the clasp.

This whole operation takes but a few seconds, and when once locked in position the badge 10 stays on for the life of the chicken. Although in some cases the wing exhibits a temporary soreness, in most cases there is no evidence of even slight soreness, and in no case has any drop in egg production or interference with the breeding or feeding habits been traced thereto. The wide sector of tough webbing 32 enclosed by the pin keeps the badge hanging vertically on the bird.

The badge 10 may be made with the card 15 about 1 inch high by 2 inches long so that the numbers on it may be approximately ¾ of an inch high. Numbers this size are readable at forty feet, as compared with the readability distance of a few inches on leg bands. If it is desired, additional data may be included on the card, such as the name of the owner, the date of hatch, and the pedigree. Never before has a marker been provided on which a hen could carry her vital statistics in full view.

I claim:

1. A fowl-marker adapted to be pinned through the tough-webbing of a fowl's wing, comprising a flat light-weight body member having a front wall portion through which a rearward view is afforded, a back wall portion, and an interior recess between said wall portions; a large identification card in said recess; and a pin mechanism mounted longitudinally on the rear wall in offset position below the lengthwise horizontal axis of said rear wall, said pin mechanism having a clasp and a pointed free arm which is engaged by said clasp when the pin is closed, said free arm being bent outwardly adjacent its point so that when said arm is clasped fastened, the pointed end passes out through the middle of its clasp.

2. The marker claimed in claim 1 in which a piece of resilient tubing surrounds a portion of the free arm of the pin where it will contact a fowl's wing when it is pinned on.

3. A fowl-marker adapted to be secured to the wing of a fowl, comprising a body portion composed of a flat envelope of transparent lightweight plastic having an inner recess adapted to receive a card; a card bearing identifying symbols and held in said recess; and a pin mounted on the exterior of the rear wall of said envelope below and parallel to the lengthwise horizontal axis of said rear wall, said pin having a clasp with a central aperture therethrough and a free arm which is bent outwardly adjacent its point to form a hook so that when the pin is closed, said hook passes out through the central aperture in said clasp.

HORACE W. DRYDEN.

REFERENCES CITED

The following references are of record in the file of this patent:

UNITED STATES PATENTS

| Number | Name | Date |
|---|---|---|
| 881,152 | Renshaw | Mar. 10, 1908 |
| 1,729,778 | Hoag | Oct. 1, 1929 |
| 1,737,201 | Reimer | Nov. 26, 1929 |
| 1,740,822 | Kupfer | Dec. 24, 1929 |
| 1,771,574 | Graham | July 29, 1930 |
| 1,776,657 | Fromm | Sept. 23, 1930 |
| 1,824,161 | Lethert | Sept. 22, 1931 |
| 1,851,000 | Berntson et al. | Mar. 29, 1932 |
| 2,035,789 | Collins | Mar. 31, 1936 |
| 2,213,449 | Mungen | Sept. 3, 1940 |
| 2,360,815 | Mungen | Oct. 17, 1944 |
| 2,364,870 | Otto | Dec. 12, 1944 |

FOREIGN PATENTS

| Number | Country | Date |
|---|---|---|
| 123,439 | Austria | June 25, 1931 |
| 434,625 | Great Britain | Sept. 5, 1935 |
| 533,390 | Germany | Sept. 11, 1931 |
| 685,438 | France | Apr. 1, 1930 |